(12) United States Patent
Atkinson et al.

(10) Patent No.: US 7,292,649 B2
(45) Date of Patent: Nov. 6, 2007

(54) 3G RADIO

(75) Inventors: Simon Atkinson, Heathfield (GB); Palle Birk, Gistrup (DK); Stacey Ho, New Braunfels, TX (US); Zoran Zvonar, Boston, MA (US); Aidan Cahalane, Dunmanway (IE)

(73) Assignee: Analog Devices, Inc., Norwood, MA (US)

( * ) Notice: Subject to any disclaimer, the term of this patent is extended or adjusted under 35 U.S.C. 154(b) by 783 days.

(21) Appl. No.: 10/331,622

(22) Filed: Dec. 30, 2002

(65) Prior Publication Data

US 2003/0157915 A1  Aug. 21, 2003

(30) Foreign Application Priority Data

Feb. 21, 2002  (GB)  .................. 0204108.5

(51) Int. Cl.
  H03K 9/00   (2006.01)
  H04L 23/00  (2006.01)
  H04B 1/30   (2006.01)
(52) U.S. Cl. .................. 375/316; 375/377; 455/324
(58) Field of Classification Search .............. 375/316, 375/377, 343, 350, 349, 229, 230, 232; 455/168.1, 455/324, 169.1, 345, 169.2, 232.1, 234.1, 455/245.1
See application file for complete search history.

(56) References Cited

U.S. PATENT DOCUMENTS

| 3,566,037 | A | * | 2/1971  | Waterloo ................... 381/11 |
| 5,179,730 | A | * | 1/1993  | Loper ...................... 455/266 |
| 5,187,809 | A |   | 2/1993  | Rich et al. |
| 5,471,652 | A |   | 11/1995 | Hulkko |
| 5,564,076 | A |   | 10/1996 | Auvray |
| 5,590,408 | A |   | 12/1996 | Weiland et al. |
| 5,668,837 | A | * | 9/1997  | Dent ........................ 375/316 |
| 5,715,526 | A |   | 2/1998  | Weaver, Jr. et al. |
| 5,722,053 | A |   | 2/1998  | Kornfeld et al. |
| 5,757,858 | A |   | 5/1998  | Black et al. |
| 5,794,159 | A |   | 8/1998  | Portin |
| 5,896,562 | A |   | 4/1999  | Heinonen |
| 5,936,969 | A | * | 8/1999  | Stiegler et al. ............. 370/508 |
| 5,974,305 | A |   | 10/1999 | Matero |

(Continued)

FOREIGN PATENT DOCUMENTS

EP  0722226  7/1996

(Continued)

OTHER PUBLICATIONS

Rabiner et al., "Theory and Application of Digital Signal Processing", 1975 Prentice Hall, pp. 230-235.*

(Continued)

*Primary Examiner*—Mohammad Ghayour
*Assistant Examiner*—Vineeta Panwalkar
(74) *Attorney, Agent, or Firm*—Wolf, Greenfield & Sacks, P.C.

(57) ABSTRACT

A homodyne receiver is provided for receiving GSM and UMTS transmissions. The receiver may also be used for other transmission schemes. The receiver includes an electronically reconfigurable low pass filter and an off set generator for providing DC offset correction for offsets which may be generated as a result of coupling between a local radio frequency oscillator and the receiver front end.

16 Claims, 7 Drawing Sheets

U.S. PATENT DOCUMENTS

| | | | |
|---|---|---|---|
| 6,014,551 A | 1/2000 | Pesola et al. | |
| 6,028,850 A | 2/2000 | Kang | |
| 6,031,878 A | 2/2000 | Tomasz et al. | |
| 6,069,925 A | 5/2000 | Koh | |
| 6,118,829 A * | 9/2000 | North | 375/317 |
| 6,125,266 A | 9/2000 | Matero et al. | |
| 6,130,590 A | 10/2000 | Kolsrud | |
| 6,148,048 A | 11/2000 | Kerth et al. | |
| 6,178,313 B1 | 1/2001 | Mages et al. | |
| 6,185,434 B1 | 2/2001 | Hagstrom et al. | |
| 6,215,988 B1 | 4/2001 | Matero | |
| 6,243,569 B1 | 6/2001 | Atkinson | |
| 6,285,767 B1 * | 9/2001 | Klayman | 381/17 |
| 6,349,216 B1 | 2/2002 | Alberth, Jr. et al. | |
| 6,377,813 B1 | 4/2002 | Kansakoski et al. | |
| 6,392,479 B2 | 5/2002 | Miura | |
| 6,405,025 B1 | 6/2002 | Keski-Mattinen | |
| 6,430,421 B1 | 8/2002 | Kiiski et al. | |
| 6,438,360 B1 | 8/2002 | Alberth, Jr. et al. | |
| 6,459,253 B1 | 10/2002 | Krusell | |
| 6,463,293 B1 | 10/2002 | Guyot et al. | |
| 6,469,995 B1 | 10/2002 | Voyer et al. | |
| 6,498,785 B1 | 12/2002 | Derryberry et al. | |
| 6,516,206 B2 | 2/2003 | Jantti | |
| 6,535,748 B1 | 3/2003 | Vuorio et al. | |
| 6,545,547 B2 | 4/2003 | Fridi et al. | |
| 6,556,635 B1 | 4/2003 | Dehghan | |
| 6,643,522 B1 | 11/2003 | Young | |
| 6,690,799 B1 * | 2/2004 | Iwase et al. | 381/17 |
| 6,707,858 B1 * | 3/2004 | Davie | 375/316 |
| 6,708,025 B2 | 3/2004 | Iwata et al. | |
| 6,708,044 B1 | 3/2004 | Puknat et al. | |
| 6,735,426 B1 | 5/2004 | Pau | |
| 6,766,178 B1 | 7/2004 | Damgaard et al. | |
| 6,868,263 B2 | 3/2005 | Filipovic | |
| 6,980,610 B2 | 12/2005 | Katsura et al. | |
| 2001/0031001 A1 * | 10/2001 | Gazsi et al. | 375/232 |
| 2002/0042256 A1 * | 4/2002 | Baldwin et al. | 455/232.1 |
| 2002/0150174 A1 * | 10/2002 | Spiegel et al. | 375/316 |
| 2002/0155822 A1 * | 10/2002 | Adachi | 455/293 |
| 2002/0187763 A1 * | 12/2002 | Lim et al. | 455/165.1 |
| 2003/0058184 A1 * | 3/2003 | Barna | 343/821 |
| 2003/0138032 A1 * | 7/2003 | Shi et al. | 375/219 |
| 2005/0048932 A1 | 3/2005 | Balasubramaniyan et al. | |

FOREIGN PATENT DOCUMENTS

| | | |
|---|---|---|
| EP | 1102413 | 5/2001 |
| WO | WO 00/31885 | 6/2000 |
| WO | WO 02/13473 | 2/2002 |
| WO | WO 02/13473 A1 | 2/2002 |
| WO | WO 03/073631 A1 | 9/2003 |

OTHER PUBLICATIONS

EPO supplementary European search report—Jun. 2, 2005.

EPO supplementary European search report.

Stroet, P.M. et al, "A zero-IF single-chip transceiver for up to 22Mb/s QPSK 802.11b Wireless LAN", 2001 IEEE International Solid-State Circuits Conference, Feb. 6, 2001, pp. 204, 205, 447.

EPO supplementary partial European search report.

Springer, A., "RF system concepts for highly integrated RFICs for W-CDMA mobile radio terminals", IEEE transactions on microwave theory and techniques, vol. 50, No. 1, Jan. 2002, pp. 254-267.

Tsurumi, H., "System-level compensation approach to overcome signal saturation, DC Offset, and 2nd-order nonlinear distortion in linear direct conversion receiver", IEICE Trans. Electron., vol. E82-C, No. 5, May 1999, pp. 708-715.

Textbook of Digital Signal Processing, Peiqing Cheng, Tsinghua University Press, 10 pages, (Aug. 31, 1995).

Patent Office of the People's Republic of China Office Action, (10 pages), Issued Apr. 6, 2007.

Apr. 6, 2007 Office Action from Patent Office of the People's Republic of China.

Cheng, P., "Textbook for Digital Signal Processing" (Chinese), Tsinghua University, Aug. 31, 1995, pp. 110-111, 142-147.

* cited by examiner

3G RADIO

FIELD OF INVENTION

The present invention relates to device architecture of mobile telephony units.

BACKGROUND

There are an emerging number of standards for cellular communication. For example, the European GSM system works in transmission bands known as GSM 850, GSM 900, GSM 1800 and GSM 1900, where the numeric part of the name is indicative of the frequency of the band expressed in MHz. Furthermore, the UMTS system operates on a transmission band between 1.92 and 1.98 GHz. It would clearly be desirable if a telecommunications device could easily switch between these various telecommunications standards depending on which service it wished to use, or indeed which service was available.

SUMMARY

According to a first aspect of the present invention, there is provided a transmitter for GSM and UMTS comprising: an in-phase/quadrature up-converter for mixing in-phase and quadrature inputs with an intermediate frequency; a GSM path including a phase locked loop; and a UMTS path; wherein a frequency generator module is provided to generate a first signal at a frequency $F_1$, and the first signal is supplied as an input to an image reject mixer in the GSM path, to a mixer in the UMTS path, and as an input to divider which divides the first signal by three to create an intermediate frequency which is supplied to the in-phase/quadrature up converter; and wherein the image reject mixer in the GSM path is controllable to select either an upper or lower side band such that the GSM path operates at either $(1+\frac{1}{3})F_1$ or $(1-\frac{1}{3})F_1$; and wherein the mixer in the UMTS path selects the upper side band so as to have a output at $(1+\frac{1}{3})F_1$.

It is thus possible to provide a transmitter arrangement operable in both the GSM bands, and the UMTS band in which many of the RF components are shared. Thus, for example, if the first signal from the frequency generator is in a band centered about 1.35 GHz, but extending as low as 1.28 GHz and as high as 1.485 GHz then it is possible to tune the transmitter to selectively operate in the GSM 850 and GSM 900 bands, and in the GSM 1800 and 1900 bands and in the UMTS band between 1.92 and 1.98 GHz.

Advantageously, the first radio frequency signal is in fact generated by an ultra-high-frequency voltage controlled oscillator working in the range of 2.565 to 2.97 GHz. This frequency can then be divided by 2 by a divider in order to ensure that the first RF frequency has an equal mark-space ratio. It will be appreciated by the person skilled in the art that transistor switching and logic technologies are now fast enough to operate at these frequencies. Furthermore, the divider can be arranged to produce in-phase and quadrature versions of the first radio frequency signal.

Advantageously, the divider for generating the intermediate frequency (i.e. a local oscillator signal) is a regenerative divider which comprises two channels, one working on the in-phase signal and one working on the quadrature signal. Each channel has a mixer which receives the first radio frequency signal and a divide by 4 circuit which receives an output of the mixer and which itself provides an input to a respective second input of the mixer. The output of the divide by 4 divider is also provided to the respective in-phase and quadrature mixers. The feedback loop formed by the mixer and the divider by 4 divider in fact forms a divide by 3 mixer, as is known to the person skilled in the art.

Preferably, the GSM transmission path comprises a phase sensitive detector having a first input for receiving an output of the in-phase/quadrature up-converter, and a second input for receiving an output of the image reject mixer in the phase locked loop. An output of the phase sensitive detector is provided to an input of a voltage controlled oscillator which in turn generates a radio frequency output signal. The output of the voltage controlled oscillator is provided to a further input of the image reject mixer. Because the image reject mixer receives both the in-phase and quadrature signals of the first signal, it can be electronically selected to output either the upper side band or the lower side band. Thus the phase locked loop can be selectively locked to a frequency of $F_1$ minus the intermediate frequency or $F_1$ plus the intermediate frequency.

The output of the voltage controlled oscillator in the GSM path is also provided to a high power amplifier which can be driven in Class C mode in order to obtain high efficiency. Driving the amplifier in Class C mode generates harmonics at multiples of the frequency of the voltage controlled oscillator. However it is apparent that these multiples are spaced apart by at least 850 MHz and therefore can be easily removed by relatively simple filtering.

The UMTS path may comprise one or more electronically controlled variable gain amplifiers serving to amplify the modulated intermediate frequency signal. The amplifiers typically only have to operate across a relatively narrow band of frequencies centered about the intermediate frequency, e.g., 450 MHz. The amplifiers can therefore be constructed to be particularly linear. The output from the amplifiers is then mixed with the first signal by a single side band mixer in order to up-convert it to the UMTS output frequency in the range of 1.92 to 1.98 GHz. The output from the mixer may then be passed through a further variable gain amplifier giving around 25 to 30 dB of gain. The output of the amplifier may be passed through a surface acoustic wave filter before being supplied to a further off-chip power amplifier. A feedback path is also provided for sampling the output of the power amplifier, detecting the output level thereof, digitizing it through an analog to digital converter and providing a measurement of the power output to a UMTS power control logic circuit.

It is thus possible, in some embodiments of the invention, to provide a multi-mode transmitter operable in both UMTS and GSM transmission modes, the transmitter comprising:

a. a signal input for receiving a signal (such as an in-phase quadrature, I/Q, baseband signal) to be upconverted by the transmitter;

b. an oscillator for generating a first radio frequency signal having a frequency $F_1$, where $F_1$ is 1.5 or 0.75 times the desired carrier frequency $F_C$;

c. a first divider for receiving the first radio frequency signal $F_1$ and dividing it by three so as to form an intermediate frequency local oscillator signal, $I_F$, having a frequency substantially at 0.25 or 0.5 times the desired carrier frequency;

d. at least one mixer for mixing the signal from the signal input with the intermediate frequency local oscillator signal to create a modulated intermediate frequency signal;

e. a GSM path responsive to the modulated intermediate frequency signal; and f. a UMTS path responsive to the modulated intermediate frequency signal;

wherein the GSM path comprises a voltage controlled oscillator within a phase locked loop, the phase locked loop including an image reject mixer receiving at a first input thereof the output of the voltage controlled oscillator, and at second inputs thereof in-phase and quadrature representations of the first radio frequency signal, such that it selectively outputs either the upper or lower side band as the signal to the phase sensitive detector within the phase locked loop; and wherein the UMTS path comprises at least one variable gain amplifier and a mixer for mixing the first radio frequency signal with the modulated intermediate frequency signal and outputting one of the side bands to a further amplifier stage.

The oscillator may be followed by a divide-by-two stage such that in-phase and quadrature versions of the divided oscillator signal can be easily obtained. In such an implementation the oscillator frequency needs to be doubled to 1.5 or 3 times the desired carrier frequency.

According to a second aspect of the present invention, there is provided a direct conversion multi-mode receiver comprising electronically reconfigurable filters.

It is thus possible, by providing reconfigurable filters, to manipulate the output from the direct conversion multi-mode receiver such that it is suitable for additional processing operations to be performed on the signal in order to extract the data therein.

Advantageously the direct conversion multi-mode receiver also comprises offset generators which can be used to apply a controllable offset to a summer which is responsive to the output of the receiver.

In the direct conversion topology, it is highly desirable in order to be able to provide an offset to the output from the receiver. A reason for this is that the down conversion is performed by mixing the received radio signal, which is nominally centered about a frequency $F_r$, with a locally produced radio signal, also having a frequency of $F_r$. It therefore follows that the carrier of the received signal is down converted to a DC signal (or very near DC in the case of oscillator frequency mismatch). Any spurious DC offset (or low frequency signal) therefore needs to be subtracted from the output of the converter in order to reduce the dynamic range required of the subsequent processing circuitry, which in reality will comprise analog to digital converters such that further processing can then be performed in the digital domain. The act of removing the DC offset means that the dynamic range and resolution of the converters required can be reduced, therefore reducing the cost of the subsequent processing circuitry.

In some embodiments, a direct conversion multi-mode receiver is provided which comprises at least one electronically reconfigurable filter arranged to filter a base band signal received from the receiver, and an offset generator, each of the reconfigurable filter and the offset generator is under the control of a control circuit such that the offset and filter response can be automatically controlled as a function of reception mode and signal conditions.

The filter may be implemented in hardware or software. Hardware implementations will tend to be preferred as they do not place so great a load upon post ADC processing resources.

According to a third aspect of the present invention, there is provided a hybrid filter exhibiting substantially uniform group delay in a pass band thereof, wherein the filter comprises a combination of a Chebychev and an inverse Chebychev response.

When designing an analog filter for communications applications, there are generally difficult trade-offs to be made between requirements for selectivity, group delay and complexity. Ideally, we want the physical delay for a signal passing through the filter to be uniform irrespective of its frequency content. Thus, in terms of a phase versus frequency graph, the phase delay needs to increase linearly with frequency.

In the context of telecommunications, and in particular UMTS communications, it is important that differential group delay be avoided as this can give rise to inter-symbol interference.

However, it is also generally necessary to obtain good selectivity, that is a rapid transition between the pass band and stop band.

It is well known that high Q filters that display good selectivity performance such as Chebychev and Elliptic filters often suffer in terms of differential group delay performance. On the other hand, filters that exhibit good differential group delay performance such as Butterworth and Bessel filters generally have inferior roll-off characteristics. The inventor has realized that combination of different filter characteristics can be arranged to give a desired response. The new filter design avoids the draw backs of conventional filter technologies and provides excellent selectivity, attenuation and differential group delay characteristics. The inventor has noted that the inverse Chebychev pass band characteristics are substantially identical to those of the Butterworth, but the filter contains stop-band zeros which give superior initial roll-off performance. On the other hand, the Chebychev filter has good initial roll-off characteristics and very high levels of ultimate attenuation.

Turning to the group delay characteristic, it is known to the person skilled in the art that at frequencies well below the cut-off frequencies, both the Chebychev and inverse Chebychev filters exhibit substantially uniform group delay. However, in the region of the cut-off frequency the first derivative of the group delay for the two different filters has opposite signs. The inventor has realized that by combining the two characteristics it is possible to achieve substantial cancellation of the group delay characteristics in the region near the cut-off frequency. This cancellation can be arranged to be sufficient to ensure that by the time the group delay cancellation begins to fail, thereby resulting in undesirable group delay characteristics, the magnitude of the signals have been sufficiently attenuated at these frequencies such that they become relatively unimportant.

The hybrid filter represents a good choice for a reconfigurable switched band multimode filter whose modes of operation may place differing demands on the filter performance. Thus, in the context of a multi-mode receiver, one mode of operation may place stringent requirements on the filter in terms of differential group delay, but not such difficult requirements in terms of selectivity. The other mode of operation might have more stringent requirements in terms of selectivity, but less difficult requirements in terms of differential group delay. The hybrid Chebychev/inverse Chebychev filter proposed here is an effective solution for both requirements. In addition to band switching the filter, it is also possible to adjust the relative cut-offs of the two constituent filters further optimizing performance in different modes of operation.

According to a fourth aspect of the present invention there is provided a dual mode single chip transceiver comprising a transmitter and a receiver, wherein frequency synthesizers are shared by the transmitter and the receiver, wherein the transmitter comprises an up-converter for receiving an input and up-converting it by mixing the input with a first synthesized frequency, and wherein in a GSM mode an offset phase locked loop is used to translate phase modulation at the up-converter output onto an RF carrier, and in a UMTS mode the up-converted signal is linearly amplified; and wherein the receiver comprises at least one direct down-converting channel for down converting the received signal.

It is thus possible to significantly reduce the implementation cost of a dual mode GSM/UMTS transceiver architecture by sharing many of the transmit and receive components within an integrated circuit.

Preferably the UMTS transmitter includes a further frequency up-conversion stage. Thus a first up-converter may produce an output at an intermediate frequency. The intermediate frequency may then be linearly amplified before being frequency up-converted to a final output frequency. This final output frequency may then be passed to a power amplifier which is not integrated with the integrated circuit. The provision of one or more power amplifiers "off-chip" reduces the signal leakage between the transmitter path and the receiver paths. This is particularly important as UMTS operates in full duplex mode and consequently signal leak through could have a degrading effect on receiver performance.

Preferably the UMTS duplex filter is also provided off-chip.

According to a fifth aspect of the present invention there is provided an automatic gain controller for a multi-mode homodyne receiver, the controller comprising an open loop controller responsive to a first signal for setting an initial gain, and a closed loop controller responsive to a measurement of signal power or amplitude for maintaining the signal power or amplitude at an output of the variable gain amplifier within a predetermined range.

It is thus possible to use an open loop controller to provide a rapid initial set up of the amplifier in order to bring it to roughly into a desired operational state, and then to "fine tune" the gain of the amplifier using a feedback loop. This enhances the set up time of the amplifier when changing mode.

UMTS radio systems require continuous full duplex operation. As part of this, automatic gain control (AGC) is required to maintain acceptable performance under varying signal level and channel conditions. The use of a homodyne architecture places certain constraints on the way in which the automatic gain controller can operate.

Homodyne receivers are susceptible to generating unwanted DC offsets in the in-phase/quadrature analog base band paths thereof. In order to maintain acceptable performance it is necessary to remove these DC offsets as they are indistinguishable from an on-channel signal. Under weak signal conditions, it is quite normal for the DC offset to be substantially larger in magnitude than the wanted signal. Thus, if the DC offsets were not removed, acceptable reception of the wanted signal is likely to prove impossible. A common approach to removing such offsets in wide band receivers is to use simple high pass filters or AC coupling (DC blocking) circuit arrangements.

Automatic gain control is achieved in homodyne receivers by adjusting the gain of analog base band amplifiers. However, adjusting the gain also adjusts the DC offset levels and thus creates a transient settling time problem with high pass filters which were introduced in order to block the DC component. As a consequence, a low band-width automatic gain control loop is desirable in order to minimize transient effects as these would occur as a result of shifts in the DC offset. However a low band-width automatic gain control is incompatible with the requirement for initial rapid acquisition of the signal.

The inventor has realized that it is possible to overcome this with a combination of a "feed-forward" or open loop automatic gain controller and a feedback automatic gain controller.

The feed-forward/open loop controller can either set up its initial values based on an initial measurement of the signal power made by a suitable measuring device, such as a full wave or half wave rectifier located at a suitable place in the receiver, for example at the output of channel select filters, or alternatively the open loop controller may make an initial gain control setting based on the desired mode of operation of the receiver. The open loop controller only operates once, at each mode change, to set up the initial parameters of the variable gain amplifiers and other components which may require gain set up. From then on, control is passed to the closed loop which makes fine adjustments to the various gain levels.

According to a further aspect of the present invention, there is provided a homodyne receiver comprising a high pass filter having a variable time constant and a variable gain amplifier, the filter and amplifier being upstream of an analog to digital converter, wherein when a step change of the gain of the variable gain amplifier is implemented the time constant of the high pass filter is reduced for a predetermined time period.

According to a further aspect of the present invention, there is provided a homodyne receiver comprising at least one signal conditioner upstream of an analog to digital converter and a high pass filter having a variable time constant, wherein when the at least one signal conditioner is operated to cause a variation to be made to the signal supplied to the analog to digital converter, the time constant of the filter is set to a reduced value.

The highpass filter may be implemented downstream of the analog to digital converter and may therefore be implemented in the digital domain.

In a homodyne direct conversion receiver, it is necessary to use a high pass filter to remove DC offsets from the analog base band signal paths. For a 3.84 MHz UMTS signal, the cut-off frequency for this high pass filter should be in the order of 10 kHz or so in order to remove the minimum level of the wanted signal energy. However, such a low cut-off frequency implies a long settling time for DC transients. The inventor has realized that the settling time for DC transients can be much improved if the cut-off frequency of the filter is temporarily increased. This significantly enhances the receiver settling time.

BRIEF DESCRIPTION OF DRAWINGS

The present invention will further be described, by way of example, with reference to the accompanying drawings, in which.

DETAILED DESCRIPTION

Figure 1:
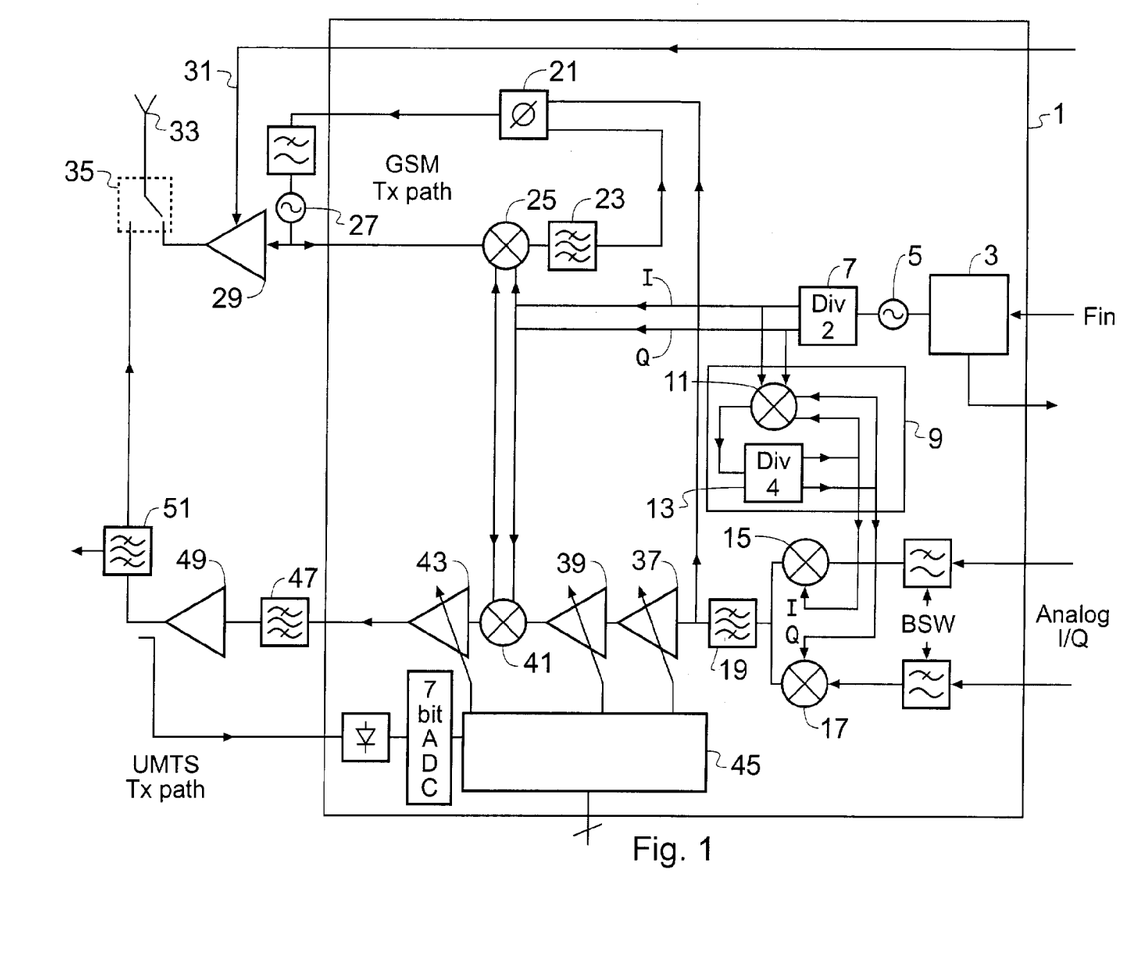
FIG. 1 is a circuit diagram schematically illustrating a combined GSM and UMTS transmitter, with shared RF components integrated into a single circuit.

FIG. 1 schematically illustrates transmitter circuitry according to an embodiment of the first aspect of the present invention. The transmitter can be selectively operated as either a dual-band GSM transmitter, or alternatively as a 3G UMTS transmitter. The transmitter comprises a single chip 1 on which is located a single radio frequency synthesizer 3. In accordance with an input signal $f_{in}$ received by the synthesizer 3, the synthesizer controls a local oscillator 5 such that the oscillator 5 produces a substantially fixed frequency signal that is at either 1½ or 3 times the desired carrier frequency, depending on the actual desired operating frequency for the GSM or UMTS transmission path. It should be emphasized that the actual frequency of the signal generated by the general oscillator 5 does not substantially differ depending upon the band of transmission, only its ratio to the desired carrier frequency. The frequency of the signal generated by the local oscillator 5 may, for example, be approximately 2.7 GHz and more specifically in the range of 2.565 to 2.970 GHz. This corresponds to a modest adjustment of ±10% (in fact around 7% in this example) of the frequency generated by the local oscillator.

The signal from the local oscillator 5 is then fed to a frequency divider 7 that divides the frequency of the signal by 2. The frequency divider 7 also allows the signal to be split into in-phase (I) and quadrature (Q) components. The I and Q components are fed into a further frequency divider 9 in the form of a regenerative divider that is arranged to divide the input frequency by 3. The divide by 3 frequency divider 9 comprises a frequency mixer 11 that receives the I and Q components of the input frequency signal and mixes them with corresponding components of the same signal that have been further frequency divided by 4 by a further frequency divider 13. The arrangement of the mixer 11 and divide by 4 divider 13 produces a divided by 3 frequency signal of the original input signal at the output of the divide by 4 divider 13. The I and Q components output from the divide by 3 divider 9 are therefore at ¼ or ½ of the carrier frequency. Taking our example of the input frequency $f_{in}$ of 2.7 GHz, the I and Q components at the output of the divide 3 divider 9 are at 450 MHz.

The individual I and Q components are supplied to respective individual mixers 15 and 17 that each also receive the respective I and Q components of the analogue source signal. The mixers 15 and 17 act to combine the respective source signal components together with the I and Q components at 450 MHz to generate a 450 MHz modulated intermediate frequency signal which it then passed through a bandpass filter 19.

The intermediate frequency at the output of the bandpass filter 19 is then propagated along two individual signal paths, each path being used to generate respectively the GSM signal or the 3G UMTS signal.

For GSM, the 450 MHz intermediate frequency signal is fed to a first input of a phase comparator 21. The second input of the phase comparator 21 also receives a 450 MHz signal that is received from a bandpass filter 23. The input to the bandpass filter 23 is derived from an image reject mixer 25. The image reject mixer 25 receives as first inputs the I and Q components of the 1.35 GHz signal that is obtained from the combination of synthesizer 3, local oscillator 5 and divide by 2 divider 7. The other input to the image reject mixer 25 is the carrier frequency signal that is generated by a voltage controlled oscillator 27 that is in turn controlled by the output from the phase comparator 21. The phase comparator 21, voltage controlled oscillator 27 and image reject mixer constitute a phase locked loop that is used to translate the modulated intermediate frequency to the radio frequency carrier signal. The phase locked loop acts as a tracking bandpass filter and thus removes the need for an RF bandpass filter such as a SAW or ceramic filter that would otherwise be required to minimize out of band emissions.

The carrier frequency is substantially either 900 MHz or 1.8 GHz, depending upon the GSM band on which it is desired to transmit. The image reject mixer can selectively either subtract the 900 MHz signal from the 1.35 GHz I and Q component signals to arrive at the 450 MHz signal input to the bandpass filters 23, or to subtract the 1.35 GHz from the 1.8 GHz carrier signal, thus also arriving at a 450 MHz output. Thus the two signals input to the phase comparator 21 are always at 450 MHz, i.e. the intermediate frequency. It is thus possible to cover the GSM 850/900 range and the GSM 1800/1900 range.

The modulated GSM signal is applied to a high power amplifier 29 that receives a power control signal on an input line 31. The output of the amplifier 29 is fed to an antenna 33 via a switch 35.

For 3G UMTS transmission, the intermediate frequency signal output from the bandpass filter 19 is fed through a pair of serially connected variable gain amplifiers 37, 39 prior to being mixed with the 1.35 GHz signal derived from the local oscillator 5 and divide by 2 divider 7. The two signals are mixed at a single side band mixer 41 to produce a 1.8 GHz signal that is itself further amplified using a further single variable gain amplifier 43. Amplifiers 37, 39 and 43 are controlled using a power control circuit 45 that receives a sampled and digitized input signal representative of the power of the transmitted output signal obtained via a tap at the output of amplifier 49. The 1.8 GHz signal from the power amplifier 43 is passed through a UMTS RF SAW filter 47 and a further UMTS power amplifier 49 before being transmitted via the antenna 33. The signal is also passed through a duplexer and isolator unit 51 connected between the antenna and the UMTS power amplifier 49 which selectively allows a received signal at the antenna to be directed towards a receiver circuit.

The great advantage of the circuit described above is that a single RF synthesizer, running at 2.7 GHz in the above example, is all that is required for the generation and transmission of both a dual mode (850/900 and 1800/1900) GSM signal and a 3G UMTS signal. The use of the dividers and mixers ensures that the desired carrier and output frequencies are always at fixed multiples of the synthesizer frequency. Thus is possible to provide a combined dual mode GSM and 3G UMTS transmitter in a single circuit that has a relatively large number of common circuit components for both transmission paths.

Figure 2:
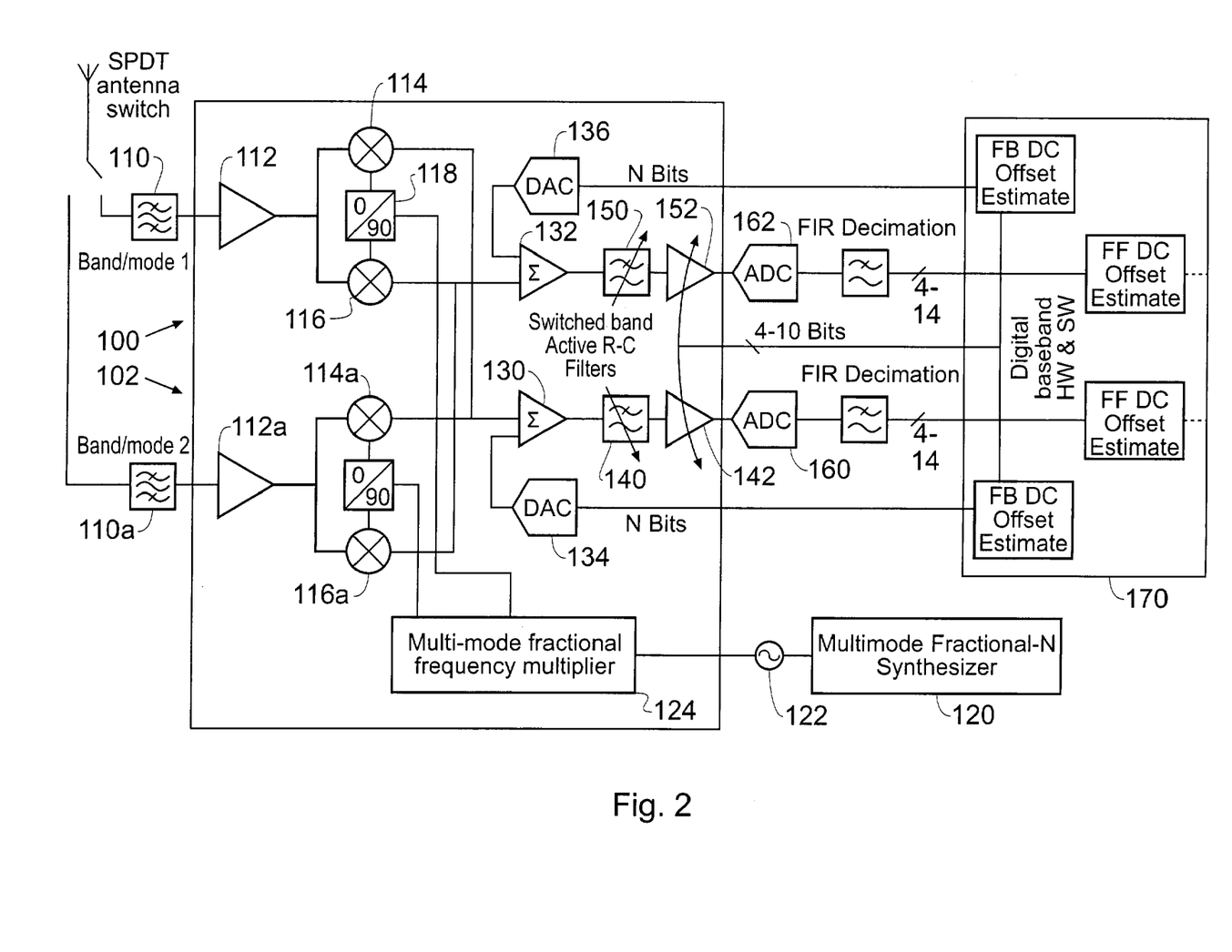
FIG. 2 is a schematic diagram of the direct conversion multi-mode receiver.

FIG. 2 schematically illustrates a direct conversion (also known as homodyne) multi mode receiver. The receiver comprises two channels, generally indicated 100 and 102 for convenience. Schematically, the channels are identical so only the first channel will be described in detail for convenience. However, in terms of operating performance, the channels may operate at different frequencies, for example around 800 to 1000 MHz for GSM 850 and GSM 900 and around 1.7 to 2.2 GHz for GSM 1800, GSM 1900 and UMTS. In these circumstances the individual components of the channels may be tailored in order to operate at their respective bands. Each channel comprises a band pass filter 110 and 110a which serves to reject signals outside the pass band of the receiver. Thus, the filter 110 for the first channel 100 may be centered 900 MHz, whereas the filter 110a for the second channel 102 may be centered around 1.8 GHz or so. These filters are necessary to stop powerful out of band transmissions from driving the receiver into saturation. The output of the band pass filter 110 is provided to an input of an amplifier 112 whose output is provided to the first inputs of mixers 114 and 116, respectfully. Second inputs of the mixers 114 and 116 receive in-phase and quadrature versions of a locally generated carrier signal. The in-phase and quadrature versions of the signal are generated by a phase shifter 118 which itself receives the locally generated signal from the combination of a multi mode fractional synthesizer 120, a voltage controlled oscillator 122 and a multi mode fractional frequency multiplier 124. The components 120, 122 and 124 are shared by each of the channels 100 and 102. The mixers 114 and 116 mix the locally generated reference signal together with the received radio signal in order to form the difference frequency therebetween. Since both the radio frequency and the locally generated frequency are nominally at the same frequency, the information in the radio frequency is directly down converted to base band. The base band signal is provided at the output of each of the mixers 114 and 116. The outputs of the in-phase mixers 114 and 114a are provided to a first input of an in-phase summer 130 which is shared between both channels. Similarly, the outputs of the quadrature mixers 116 and 116a are provided to the first input of a quadrature summer 132 which is also shared between both channels. Each of the summers 130 and 132 is also connected to receive an offset signal generated by a respective digital to analog converter 134 and 136. The ability to provide an offset is important since local oscillator coupling to the RF inputs could generate a DC offset, the size of which depends on both the magnitude and phase of the spuriously coupled signal with respect to the locally generated reference. The output of the summer 130 is provided to the input of an electronically controlled low pass filter 140 which in turn is followed by an electronically controlled variable gain amplifier 142. Similarly the output of the summer 132 is provided to an electronically controlled low pass filter 150 and a variable gain amplifier 152. The outputs of the amplifiers 142 and 152 are provided to respective analog to digital converters 160 and 162 whose digital outputs, after filtering in respective finite impulse response filters are provided to a signal processing and control unit 170. For each of the in-phase the quadrature channels, the control unit estimates the offset that is required for each of the channels and provides an offset signal to the digital to analog converters 134 and 136. The control unit 170 also sets up the filter characteristics of the switched filters 140 and 150 in the way appropriate to the operating mode of the receiver.

It is thus possible to provide a multi mode direct conversion receiver architecture as shown in FIG. 2. The architecture has the advantage that much of the receiver hardware is reused for different modes of operation. The reuse of common hardware can provide a significant cost and power saving when compared with duplicating functionality as has hitherto been the case.

The analog base band sections are designed so that they can be reconfigured to meet the requirements of the various transmission systems. This means that the architecture must allow for the:
i. reconfiguring of the gain line up,
ii. reconfiguring of the channel filters
iii. reconfiguring of the analog to digital converters speed and resolution, and
iv. reconfiguring of the DC offset compensation As noted hereinbefore separate radio frequency low noise amplifiers and in-phase/quadrature down converters are utilized as these need to be optimized for the frequency and mode of operation. Although in principle it is practical to have a reconfigurable RF front end for different modes of operation, it is believed to be more cost effective at the present time to have dedicated RF front ends.

Figure 3:
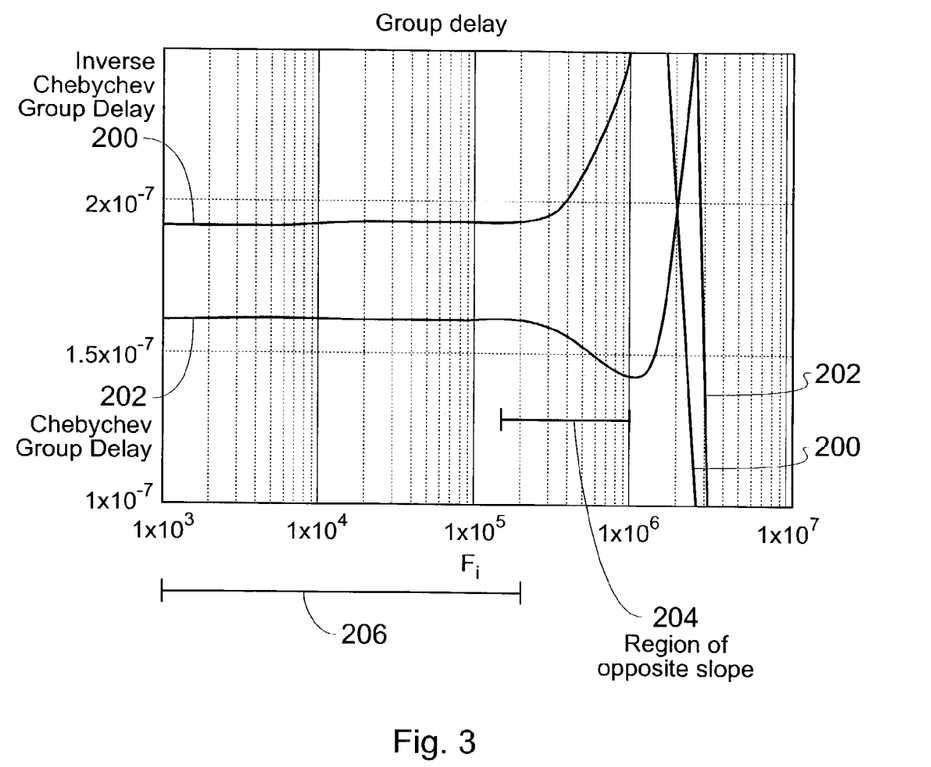
FIG. 3 is a graph comparing the group delays of low pass Chebychev and inverse Chebychev filters versus frequency.

As noted hereinbefore, it is highly desirable that the analog processing circuitry within a mobile telephone has filters included therein which can give both rapid attenuation between the pass band and the stop band, and which also exhibit good group delay, and specifically do not exhibit differential group delay so as to avoid inter-symbol interference. FIG. 3 compares the group delays of an inverse Chebychev filter, represented by line 200, and the group delay of a Chebychev filter, represented by line 202, plotted as a function of frequency. Frequency units have been included on the ordinate of FIGS. 3, 4 and 5 such that the various graphs can be easily compared. It will be seen that, in the example given in FIG. 3, the inverse Chebychev group delay starts to increase for frequencies in excess of $2\times10^5$ radians per second. However, the Chebychev group delay starts to decrease for angular frequencies in excess of $2\times10^5$ radians per second and this decrease continues until the frequency $10^6$ radians per second, then the Chebychev group delay increases sharply. It will be appreciated that in the limited region 204 where the group delays are of an opposite sign, partial cancellation of the group delay characteristics can be achieved thereby effectively extending the region 206 extending from low frequencies up to approximately $2\times10^5$ radians per second where the group delays are essentially invariant with respect to frequency to an increased upper frequency of $10^6$ radians per second.

Figure 4:
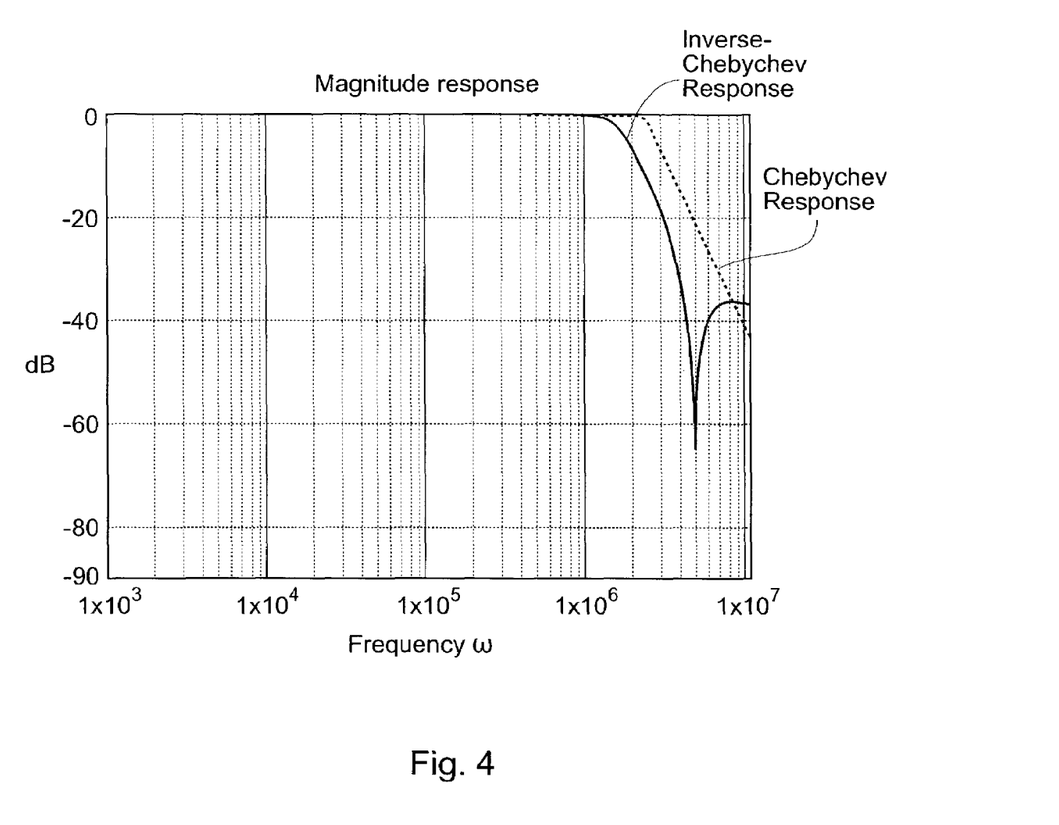
FIG. 4 is a graph of the magnitude response of low pass Chebychev and inverse Chebychev filters versus frequency.

FIG. 4 schematically illustrates the magnitude response for the inverse Chebychev and Chebychev filters whose group delays were shown in FIG. 3. It can be seen that the inverse Chebychev filter in this example has a substantially flat magnitude response up to approximately $10^6$ radians per second, and then the magnitude response falls steeply towards a notch occurring at $5\times10^6$ radians per second. At this point, the magnitude of the response is suppressed by over 60 dB. The Chebychev filter also has a substantially uniform magnitude response in the pass band, but has a roll over frequency of approximately $2\times10^6$ radians per second from where the magnitude falls off rapidly.

Figure 5:
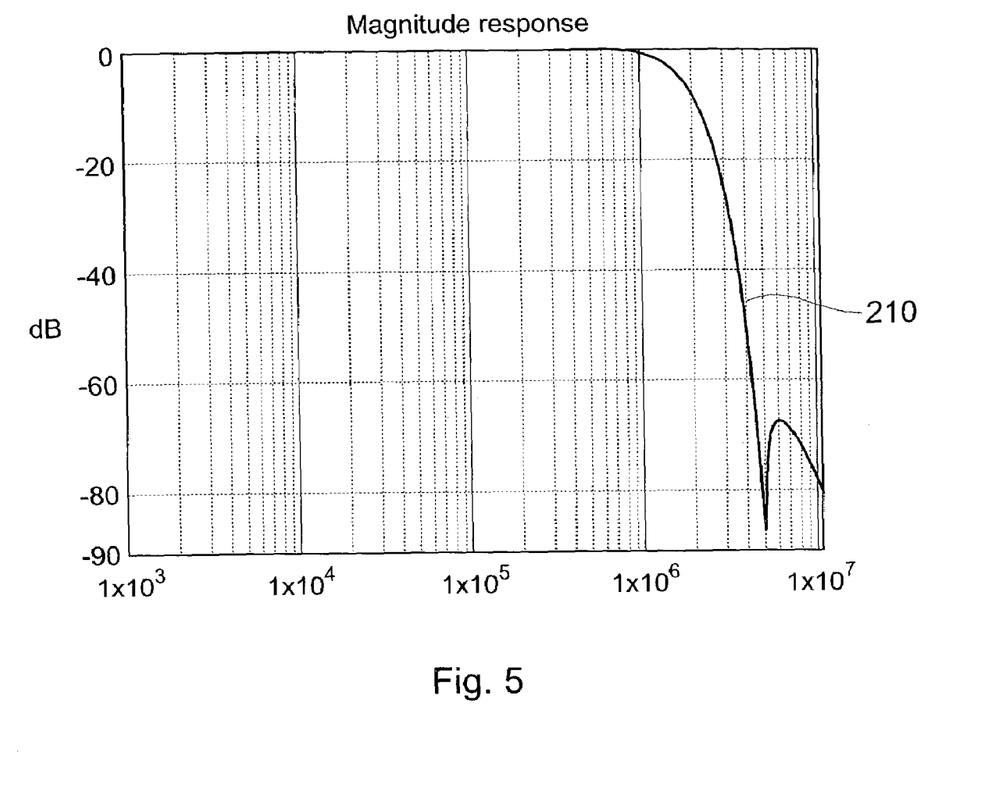
FIG. 5 shows the combined magnitude response of the filters of FIG. 4.

FIG. 5 shows the combined magnitude response of a Chebychev/inverse Chebychev filter using the individual filters shown in FIGS. 3 and 4. It is seen that the combined response 210 is substantially flat up to $10^6$ radians per second and then falls steeply, being approximately 10 dB down by $2\times10^6$ radians per second and over 60 dB down by $5\times10^6$ radians per second. Furthermore, the group delay can be maintained as substantially constant up to $1\times10^6$ radians per second.

It is appreciated by the person skilled in the art that analog filter design is an immensely complex mathematical exercise. It is, however, also well known that many filter designs have already been analyzed and described in a normalized form such that an engineer can effectively use a "recipe" of a standard form to design a specific filter characteristic. Furthermore, computer aided design packages now also allow for filter characteristics to be accurately depicted. For these reasons, the specifics of the design do not need to be described in detail as sufficient support exists in the prior art to enable the person skilled in the art to implement the filter. However, for the specific filters whose responses are shown in FIGS. 3 to 5, the Pole positions for Inverse Chebychev response were calculated by first calculating the pole positions for Chebychev response and using pole reciprocation.

$$p = \begin{bmatrix} 1.204 + & 2.258i \\ 2.408 & \\ 1.204 - & 2.258i \\ -1.204 - & 2.258i \\ -2.408 & \\ -1.204 + & 2.258i \end{bmatrix}$$

Valid poles exist in the negative half of the S-plane $$z = \begin{bmatrix} 0 \\ 1.155i \\ 0 \\ 1.633 \cdot 10^{16}i \end{bmatrix} \quad \omega z := |z_1|$$

Position of stopband zero

The Inverse Chebychev Transfer function used was $$Hic_i := \frac{\left[\left(\frac{1}{p_3}\right) \cdot \left(\frac{1}{p_4}\right) \cdot \frac{1}{p_5}\right] \cdot \left[\left(\frac{s_i}{\omega c}\right)^2 - (z_1)^2\right] \cdot \left[\left(\frac{s_i}{\omega c}\right)^2 - (z_3)^2\right]}{\left[\left[\left(\frac{s_i}{\omega c} - \frac{1}{p_3}\right) \cdot \left[\left(\frac{s_i}{\omega c}\right) - \left(\frac{1}{p_4}\right)\right] \cdot \left[\left(\frac{s_i}{\omega c}\right) - \left(\frac{1}{p_5}\right)\right] \cdot [(z_1)^2] \cdot (z_3)^2\right]\right]}$$

The Pole Positions for solution to Chebychev Polynomial were $$p1 = \begin{bmatrix} 0.313 + & 1.022i \\ 0.626 & \\ 0.313 - & 1.022i \\ -0.313 - & 1.022i \\ -0.626 & \\ -0.313 + & 1.022i \end{bmatrix}$$

Valid poles exist in the negative half of the S-plane
The Chebychev Transfer Function used was $$Hc_i := \frac{p1_3 \cdot p1_4 \cdot p1_5}{\left[\left(\frac{s_i}{\omega c1} - p1_3\right) \cdot \left(\frac{s_i}{\omega c1} - p1_4\right)\left(\frac{s_i}{\omega c1} - p1_5\right)\right]}$$

The Transfer Function of Hybrid Filter is the combination of the two individual transfer functions:

$$X_i := (Hc_i \cdot Hic_i)$$

Being a hybrid filter, each of the two elements of the filter can be individually adjusted to better tailor the response of the filter to meet the needs of the particular application For example, with the Chebychev response, it is possible to adjust the following:
1. The cut-off frequency
2. The filter order (number of poles)
3. The in-band ripple For the Inverse Chebychev filter, it is possible to adjust the following:
1. The minimum stop-band attenuation
2. The maximum tolerable pass-band roll off
3. The relative frequency at which the minimum stop-band attenuation is reached
4. The filter order The filter order can be adjusted by implementing the filter as a cascade of filter stages (i.e. the stages are connected one to another) whereby one or more stages can be switched out of the cascade such that they are bypassed. Thus bypassing a stage reduces the order of the filter.

Figure 6:
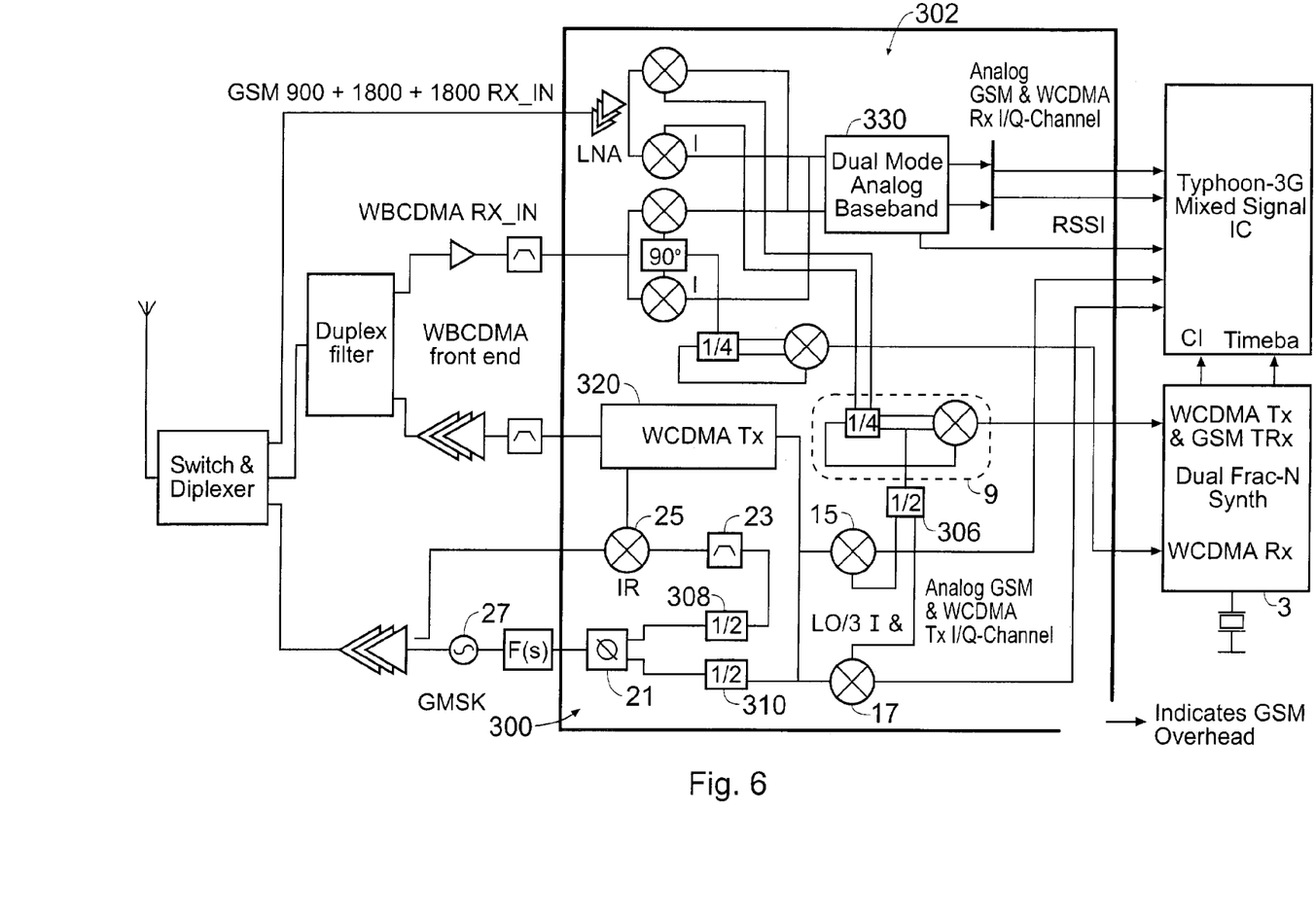
FIG. 6 schematically illustrates a combined GSM/UMTS transceiver.

FIG. 6 schematically illustrates a dual mode GSM/UMTS transceiver constituting an embodiment of the present invention. The transceiver generally comprises a transmission channel 300 and a reception channel 302. Although represented in simplified form in FIG. 6, the transmission channel 300 actually contains the dual mode transmitter shown in FIG. 1 of the present drawings. In order to simplify the understanding of FIG. 6, those parts of FIG. 6 which are similar to parts shown in FIG. 1 will be given like reference numerals thus, it can be seen that the transmitter receives a frequency synthesized signal from a synthesizer 3, that this synthesized signal is passed through a divide by three frequency divider 9 before being provided to the in-phase and quadrature mixers 15 and 17 of the up-converter. The output of the up-converter is, in a GSM mode supplied to a phase locked loop frequency shifter comprising a phase detector 21, a voltage controlled oscillator 27, a mixer 25 and a band pass filter 23. Thus the operation of these components is as described hereinbefore with reference to FIG. 1. It may be noticed that there are further divide by two frequency dividers 306, 308 and 310 shown in the transmitter schematic, but it will be appreciated that these have little overall effect on the final operation of the transmitter, and in particular that frequency dividers 308 and 310 effectively nullify each other, although they do allow for the mark space ratio of the wave forms to be converted to an ideal 50-50. Similarly, the UMTS path comprises an array of linear amplifiers and a frequency up-converter. The components labeled 37, 39, 41 and 43 as shown in FIG. 1 are schematically represented by the box 320 in FIG. 6.

It will be appreciated that the receiver section 302 is a simplified representation of FIG. 2. Here the multi-mode fractional frequency multiplier 124 of FIG. 2 is also embodied within the dual fraction synthesizer 3 shown in FIG. 6. It can also clearly be seen that two channels are provided, each having an in-phase and quadrature mixer for frequency down-converting the received signal to the base band. The components 130, 132, 134, 136, 140, 142, 150, 152, 160 and 162 of FIG. 2 are schematically represented by the box 330 in FIG. 6. It is clear that both the transmitter channels share components, both the receiver channels share components, and indeed that the receiver and transmitters share the frequency synthesizer components. This sharing of components allows for cost reductions in the final price of the integrated circuit, and also reduces the overall power consumption of the transceiver compared to implementations where each of these components are provided for their individual functions, and hence effectively duplicated.

GSM works on a time division duplex system and hence the transmitter and receiver are not operating concurrently.

However UMTS operates on full duplex and consequently the transmitter and receiver do operate concurrently. In the UMTS mode it is important to limit the desensitization of the receiver due to interactions with the UMTS transmitter. This is achieved firstly by not integrating the low noise power amplifier with the chip itself, and secondly by limiting the transmitter power at the transmitter output pins. Furthermore, it is important to ensure that the noise level in receive band at the transmit output is adequate. For example, with an external low noise amplifier having 13 dB of gain, the transmit power being limited to +3 dBm at the transmitter output pin and a transmit noise floor in the receive band of −140 dBc/Hz if isolation of 30 dB is obtained between the transmitter and receiver then the impact of the transmitter on receiver sensitivity will be approximately 0.1 dB.

The architecture shown in FIG. 6 is operable in several modes, the frequency plan for the transceiver may be as follows:

GSM 850/900 receive mode—the synthesizer frequency is three times the RF frequency.

GSM 1800/1900 receive mode—the synthesizer frequency is 1.5 times the carrier frequency.

UMTS receive mode—the synthesizer frequency is 1.5 times the RF carrier frequency.

GSM 850/900 transmit mode—the synthesizer frequency is 3 times the RF carrier frequency and the intermediate frequency is a ½ of the RF carrier frequency.

GSM 1800/1900 transmit mode—the synthesizer frequency is 1.5 times the RF carrier frequency and the intermediate frequency is ¼ of the RF carrier frequency.

UMTS transmit mode—the synthesizer frequency is 1.5 times the RF carrier frequency and the intermediate frequency is ¼ of the RF carrier frequency.

Figure 7:
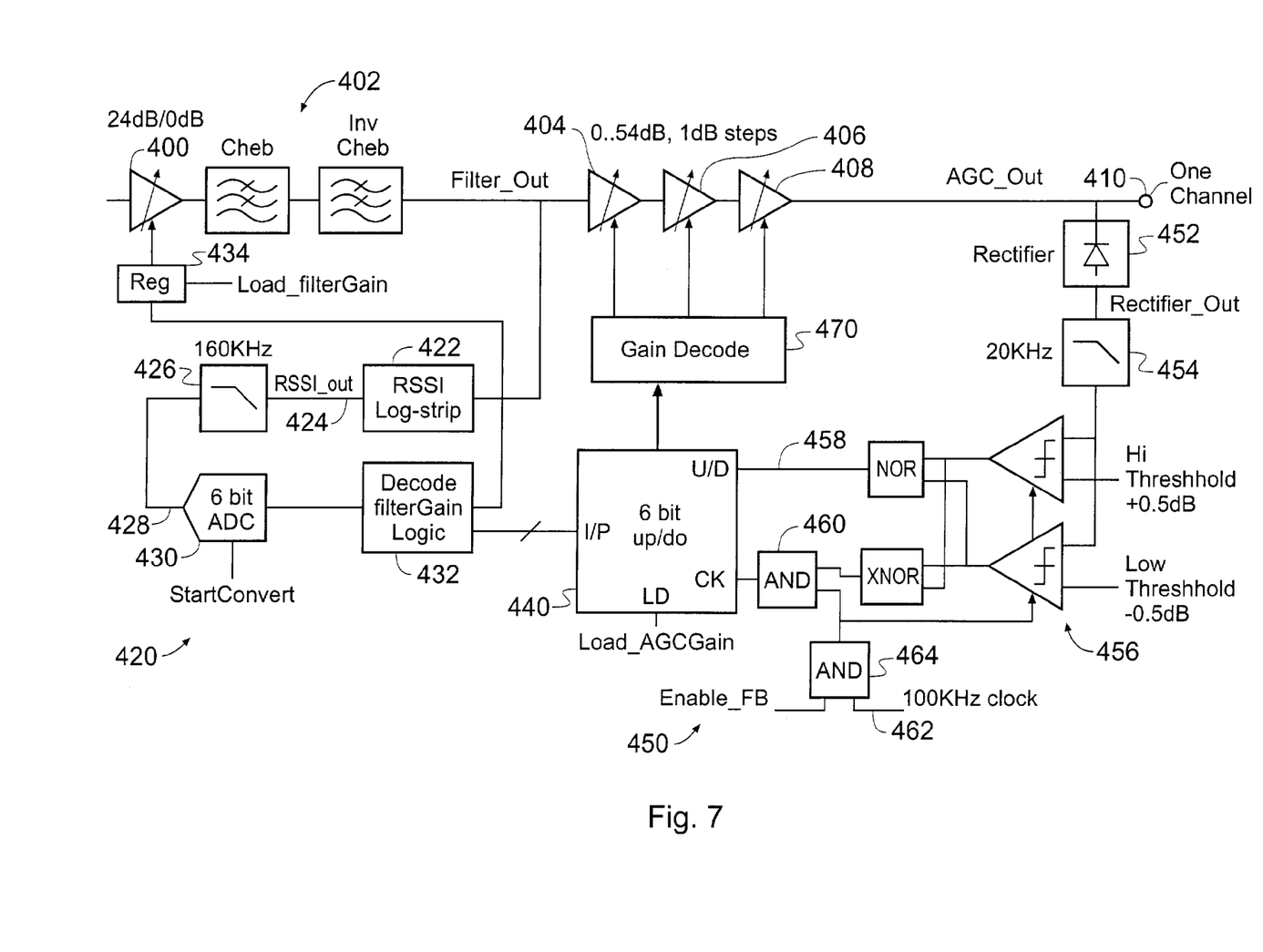
FIG. 7 schematically illustrates an automatic gain control.

FIG. 7 schematically illustrates a hybrid feed forward and feed back automatic gain control system constituting an embodiment of the present invention. The circuit diagram shows a variable gain amplifier whose output is supplied to the hybrid Chebychev/inverse Chebychev filter, generally indicated 402, which has hereinbefore been described. An output of the hybrid filter 402 is provided to the input of a further variable gain amplifier which is schematically represented as three independently electronically controllable variable gain amplifiers 404, 406 and 408 which together serve to provide a variable gain between zero and 54 dB in one dB steps. An output of the final amplifier 408 is provided as an output 410 from the automatic gain controller.

The feed forward controller, generally indicated 420, comprises a received signal strength indicator (RSSI) log strip which has an input connected to the output of the hybrid filter 402. The RSSI log strip is used to estimate the signal strength at the output of the hybrid filter. The RSSI log strip 422 produces as an output thereof 424 a voltage which is substantially linearly proportional to the composite power of the signal at the output of the filter expressed in dBm. This output signal is filtered by a low pass filter 426 before being supplied to the analog input 428 of a six-bit analog to digital converter 430. The signal at the input 428 of the analog to digital converter 430 is digitized in response to a "start convert" signal and the output of the conversion is supplied to a filter gain logic controller 432. The filter gain logic controller has two outputs, one of which is supplied to a register 434 for controlling the gain of the variable gain amplifier 400, whilst the other output is supplied as a 6-bit word to a 6-bit updown counter 440. Thus, the counter can be loaded with the output of the filter gain logic controller 432.

The signal in a UMTS receiver is a composite of the wanted signal, noise and any residual interfering signals. This composite signal appearing at the output of the hybrid filter 402 is digitized to produce a digital word that has the characteristic of "A" dB per bit, where A represents an arbitrary number. This control word is used to set the gain of the variable gain amplifiers. The variable gain amplifiers are designed to have a gain reduction characteristic of "A" dB per bit. As such, if the signal level into the receiver increases by 5A dB, then the digitized control word will also increase by 5. This in turn will result in the reduction of the gain of the variable gain amplifiers 404, 406 and 408 by a composite gain amounting to 5A dB. Thus the signal level at the output of the variable gain controller 410 is kept substantially constant. Because the approach described so far uses feed forward techniques, there are no band-width implications that might affect a feed back system. Thus, it is possible to rapidly set up gain for the automatic gain controller for example when switching modes of operation or channels. Having rapidly acquired the composite signal level and setting up an initial gain, further gain control is performed by a feedback scheme.

The feedback controller, generally indicated 450, comprises a rectifier 452 connected to the output of amplifier 408 in order to deduce a rectified signal representing the signal power at the output of the amplifier 408. The signal from the rectifier 452 is low pass filtered by a filter 454 before being supplied to the inputs of a window comparator 456 which, as recognized by the person skilled in the art, compares the signal at the input therein with high and low thresholds defining a window and produces an output 458 which is indicative of whether the signal is below the window threshold or above the window threshold. The signal 458 is provided to a count direction control input (up/down input) of the counter 440. As shown in FIG. 7, the window comparator 456 is also configured to provide an output which indicates when the input thereto is within the bounds defining the window, and this output is sent to an AND gate 460 which serves to gate the provision of a clock signal to the counter 440. Thus, when the output 410 is within the power band defined by the window comparator 456, the counter 440 is inhibited from receiving its clock signal. The clock signal 462 is also ANDed with an "enable feedback" signal at an AND gate 464 which gives overall control of whether the feedback loop should operate or not. The output of the AND gate 464 is provided to an input of the AND gate 460, the output which is connected to the clock pin of the counter 440. The output of the counter 440 is provided to a gain decoder 470 which in turn sets the gains of the amplifiers 404, 406, and 408.

In use, the signal level detector and window comparator is used to ensure that the composite signal level and the amplifier outputs is kept within a narrow range, for example +/−0.5 dB. If the composite signal level is above the threshold of the window comparator, the up/down counter is enabled and the gain is adjusted on every clock cycle. As such, the clock sets the time constant of the feedback loop. If the composite signal level is below the window comparator threshold, then the up/down counter is also enabled, but this time counts in the opposite direction. As a consequence, the feedback loop will act to always ensure that the composite signal level is tightly controlled and adjusted at a rate determined by the frequency of the clock 462.

Referring to FIG. 2, it should be noted that every time a gain control adjustment is made or a offset correction is made, this step change can result in a transient DC offset appearing at the output of the filter. The DC offsets could be removed by a high pass filter, but for a truly generic receiver it is better that the DC offset correction should be performed in the digital domain. Thus at each gain change a new DC offset is estimated and the estimate is supplied to the converters 134 and 136 such that a correction is added at the summers 130 and 132. This said, the transient occurring as a result of gain change still has an unwanted effect of the low pass filters 140 and 150. This transient decays in time, but during the settling time of the filter the homodyne receiver is effectively blinded. This is because the conversion range of the analog to digital converter will necessarily be limited, and the offset may cause the converter to have to convert outside its nominal operating range.

Given that the receiver is effectively non-functional during this transient period, the inventor has realized that it is permissible to change the filter characteristics during the short period in order to allow for a more rapid settling time. Thus, when a change in gain or offset is implemented, the high pass filter is simultaneously, or near simultaneously set to a wide bandwidth such that the DC transient will quickly settle. The settling time can be estimated from known characteristics of the filter. After the settling time, the filter is automatically switched back to the nominal required setting for its proper operation. The filter can be under the control of a timer, for example implemented as a monostable, which alters the filter characteristics for a brief but well defined period. This technique ensures the fastest possible receiver settling time whilst at the same time minimizing the amount of wanted modulation energy that might be removed by the high pass filter. A typical ratio between the two bandwidth settings might be in the order of 10 to 1, although this is only a non-limiting example and other ratios may be chosen by the design. The implementation of this technique is not dependent on the filter technology. Thus the filter might be implemented as a switched capacitor filter, a switched bandwidth active R-C filter, gyrator- capacitor filter and so on. The specific implementation of the filter is within the knowledge of the person skilled in the art.

It is thus possible to provide a multi mode receiver and transceiver which are particularly suited for use in mobile telephony.

The invention claimed is:

1. A direct conversion multimode receiver including at least one electronically reconfigurable filter wherein the receiver is operable in a plurality of receive modes to receive transmissions, wherein the electronically reconfigurable filter receives signals derived from said received transmissions to be filtered and filters said derived signal with a combination of a Chebychev filter and an inverse Chebychev filter, and wherein the reconfigurable filter operation is adjusted as a function of the receive mode to filter the derived signals and to present corresponding filtered signals for further processing within the receiver.

2. A receiver as claimed in claim 1, in which the electronically reconfigurable filter is a low pass filter.

3. A receiver as claimed in claim 1, in which the at least one filter is responsive to a filter controller.

4. A receiver as claimed in claim 1, in which the inverse Chebychev filter is controllable so as to adjust at least one characteristic thereof selected from a list comprising minimum stop band attenuation, maximum tolerable pass band roll off, frequency at which minimum stop band attenuation is reached, and the order of the filter.

5. A receiver as claimed in any one of claims 1-3 and 4, wherein the Chebychev filter is controllable to adjust at least one characteristic from a list comprising cut-off frequency, an order of the filter and pass-band ripple.

6. A receiver as claimed in claim 1, wherein the receiver further includes at least one DC offset generator which is responsive to a controller so as to add a DC offset to a down converted signal within the receiver so as to reduce DC offsets occurring within the receiver.

7. A receiver as claimed in claim 6, in which the DC offset generated by the DC offset generator is added to the down converted signal upstream of the at least one electronically reconfigurable filter.

8. A receiver as claimed in claim 6, in which the DC offset generated by the DC offset generator is added to the down converted signal downstream of the at least one electronically reconfigurable filter.

9. A receiver as claimed in claim 1, in which the receiver has an "in-phase" channel and a "quadrature" channel.

10. A receiver as claimed in claim 1, further comprising a variable gain amplifier responsive to a controller so as to maintain signal amplitude at an output of the variable gain amplifier within a predetermined range.

11. A receiver as claimed in claim 6, in which the signal from the receiver is converted to a digital form by an analog to digital converter, and the control is responsive to the digital form and uses this to derive the DC offset to be applied by the offset generator to the down converted signal.

12. A receiver as claimed in claim 1, further comprising first and second radio frequency front ends for receiving transmissions in at least first and second frequency bands or transmission modes.

13. A receiver as claimed in claim 12, in which the first radio frequency front end is arranged to receive at least one of GSM 850 MHz and GSM 900 MHz transmissions.

14. A receiver as claimed in claim 12, in which the second radio frequency front end is arranged to receive at least one of GSM 1800 MHz and GSM 1900 MHz transmissions.

15. A receiver as claimed in claim 12, in which one of the front ends is arranged to receive at least one of UMTS 2100 MHz and UMTS 1900 MHz.

16. A receiver as claimed in claim 1, wherein the group delay of the Chebychev filter and the group delay of the inverse Chebychev filter substantially cancel each other in a region near the cut-off frequencies of the filters.

* * * * *